United States Patent [19]

Manzoni

[11] Patent Number: 4,914,972

[45] Date of Patent: Apr. 10, 1990

[54] DEVICE INCORPORATING THREE CABLES FOR CONTROLLING A MIRROR SUPPORT FOR A VEHICLE REARVIEW MIRROR

[75] Inventor: Bernard Manzoni, Saint-Claude, France

[73] Assignee: Societe Manzoni Bouchot, France

[21] Appl. No.: 241,340

[22] Filed: Sep. 7, 1988

[30] Foreign Application Priority Data

Sep. 9, 1987 [FR] France ................ 87 12503

[51] Int. Cl.⁴ .................... F16C 1/10; B60R 1/06
[52] U.S. Cl. ........................... 74/502.1; 248/485
[58] Field of Search ............ 74/502.1; 248/485, 487; 350/636, 634, 632

[56] References Cited

U.S. PATENT DOCUMENTS 3,917,212 11/1975 Hadley ......................... 248/487
4,444,466 4/1984 Deshaw ....................... 360/632
4,585,200 4/1986 Fisher .......................... 248/487

FOREIGN PATENT DOCUMENTS 2431939 2/1980 France .................... 74/502.1
2454938 11/1980 France .................... 74/502.1

Primary Examiner—Gary L. Smith
Assistant Examiner—F. Saether
Attorney, Agent, or Firm—Remy J. VanOphem

[57] ABSTRACT

A device incorporating three cables for controlling a mirror support of a vehicle rearview mirror, which includes, between, on the one hand, a fixed plate on which are flanged the sleeves of the cables and, on the other hand, the support of the mirror, a crosspiece having four journals aligned in two's in two perpendicular directions and mounted in clippable fork-joints on the plate and support, respectively. According to the invention, the journals of each pair are more remote from one another than those of known crosspieces. The crosspiece has guiding bearing surfaces extending perpendicularly to a pivoting axis in order to cooperate with friction tabs on the mirror support and other guiding bearing surfaces extending perpendicularly to the other pivot axis in order to cooperate with friction tabs on the fixed plate.

6 Claims, 2 Drawing Sheets

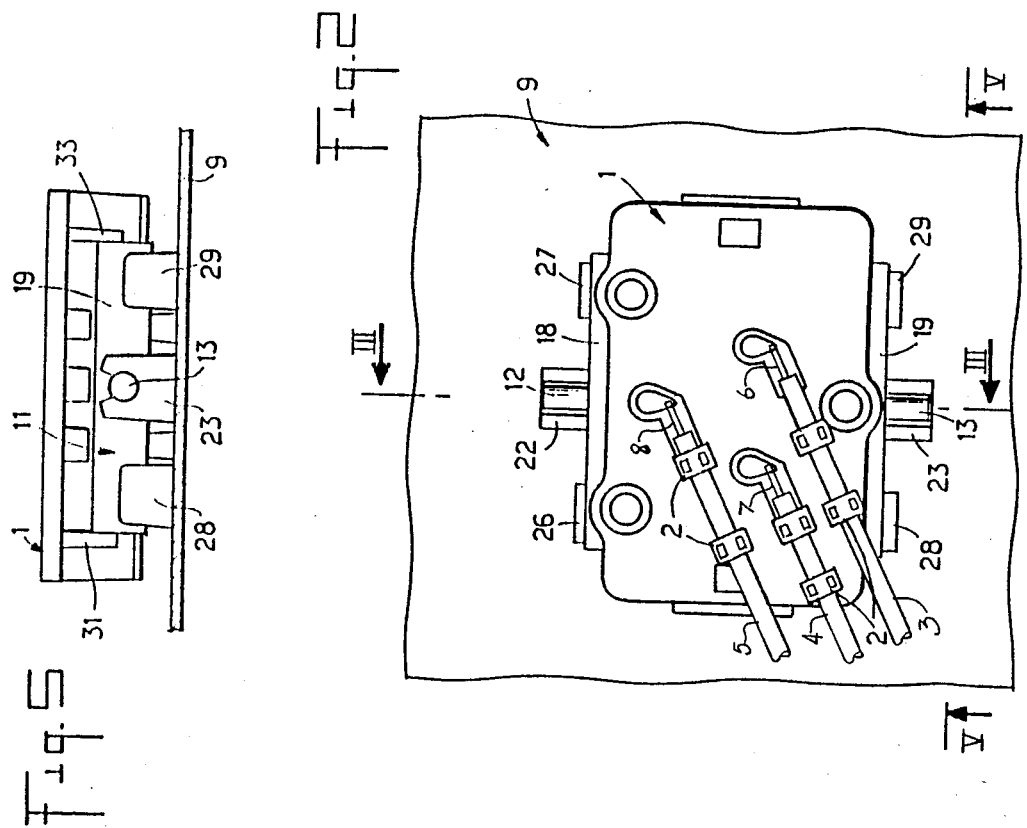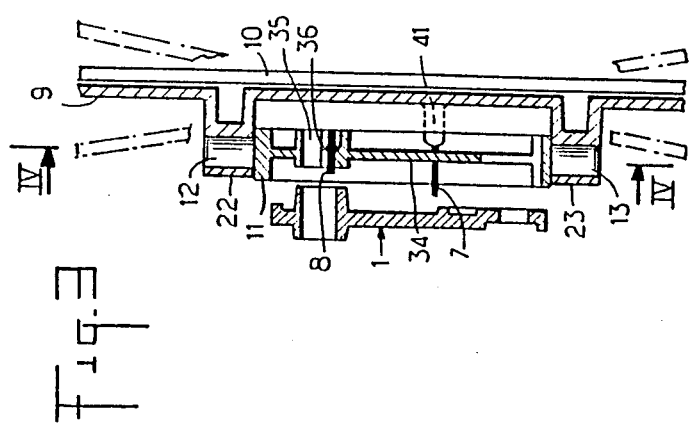

_4,914,972_

DEVICE INCORPORATING THREE CABLES FOR CONTROLLING A MIRROR SUPPORT FOR A VEHICLE REARVIEW MIRROR

BACKGROUND OF THE INVENTION

1. FIELD OF THE INVENTION

The present invention relates to a device incorporating three cables for controlling a mirror support for a review mirror of a vehicle, and in particular of an automobile vehicle.

2. DESCRIPTION OF THE PRIOR ART

Such a device is disclosed by French Pat. No. 2,431,939. It has between, on the one hand, a fixed plate on which are flanged the sleeves of the cables and, on the other hand, the support of the mirror, a crosspiece presenting four journals aligned in two's in two perpendicular directions and mounted in clippable fork joints on the plate and on the support, respectively, in order to allow up-down pivoting about a first axis and left-right pivoting about a second axis under the control of the three cables of which the ends are attached, for one, on the crosspiece and, for the other two, on the support, or inversely, for one, on the support and for the other two, on the crosspiece.

A disadvantage on the known rearview mirror is that the mirror vibrates when the engine is operating, whether the vehicle is stopped or moving. The mirror then reflects a shaky image and cannot guarantee a perfect drive.

It is an object of the present invention to eliminate the vibrations, while permitting adjustment of the up-down, left-right orientation of the mirror.

In a known embodiment, the control device incorporating three cables has, in order to attenuate the vibrations, two spherical skirts integral with the plate and support, respectively, the skirts freely rubbing against each other and defining therebetween a cavity in which the crosspiece is freely housed.

However, the resistance to vibration is not perfect in these known devices.

SUMMARY OF THE INVENTION

In accordance with the present invention each pair of journals are more remote from one another than those of known crosspieces. The crosspiece has guiding bearing surfaces which extend perpendicularly to a pivoting axis in order to cooperate with friction tabs on the mirror support and other guiding bearing surfaces which extend perpendicularly to the other pivot axis in order to cooperate with friction tabs on the fixed plate.

According to a particularly advantageous embodiment, the crosspiece is a square or rectangular frame of which two parallel sides have projecting journals clipped in open bearings which are integral with the mirror support along the right-left pivot axis. The support also is integral with friction tabs placed in contact with the two sides forming guiding bearing surfaces, while the other two parallel sides of the frame having projecting journals clipped in open bearings which are integral with the plate along the up-down pivot axes. The plate is also integral with friction tabs placed in contact with the other two sides which form guiding bearing surfaces.

Furthermore, the frame may be perforated in its central part to permit passage of the ends of the two cables which are fastened on the mirror support, the frame having a median rib on which the end of the third cable is fastened.

An object of the present invention is to eliminate the vibrations of the mirror and to adjust the resistance to these vibrations independently depending on the up-down pivoting and left-right pivoting.

A further object of the present invention is to reduce the costs of manufacturing and assembling of the rearview mirror.

The objects of the present invention will be better understood upon a reading of the detailed description thereof with reference of the accompanying drawings.

BRIEF DESCRIPTION OF THE DRAWINGS

FIG. 2 is a plan view of the device;

FIG. 3 is an elevational sectional view taken along line III—III of FIG. 2;

FIG. 5 is an elevational view taken along line V—V of FIG. 2.

DETAILED DESCRIPTION OF THE PREFERRED EMBODIMENT

Figure 1:
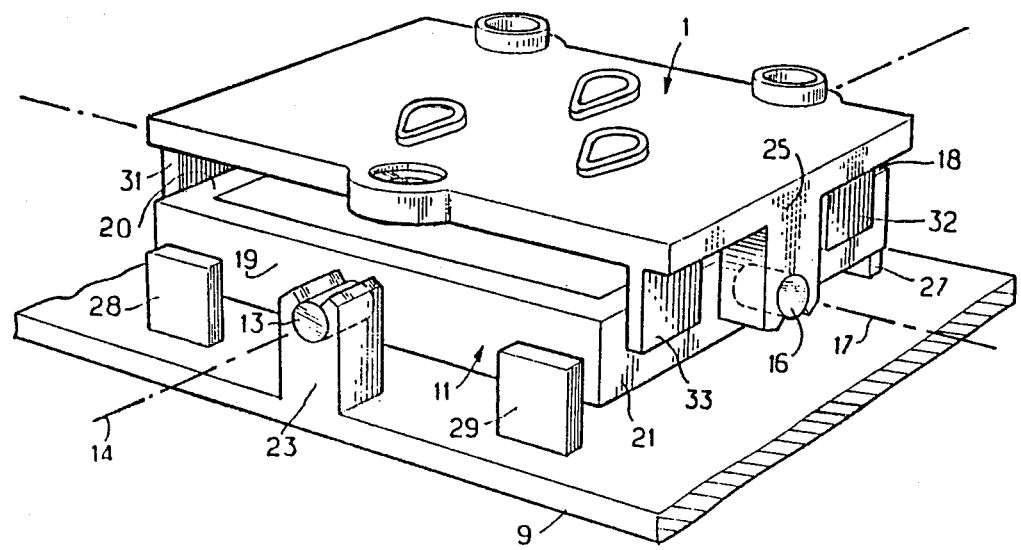
FIG. 1 is a schematic view in perspective illustrating a preferred embodiment of the improved device according to the invention.

Referring now to the drawings, the rearview mirror has, as is well known, a housing or like element made of plastic material which is not illustrated in the drawings. The housing is pivotably mounted about a substantially vertical axis on a bracket fixed on the vehicle (the door or body in the case of an automotive vehicle) and is immobilized in neutral position by an indexing means so that the housing is normally fixed but may be retracted forwardly or rearwardly, particularly in the event of a shock.

In the housing a plate 1 is attached which is preferably made of molded plastic material and includes flanges 2 allowing for the attachment of flexible sleeves 3, 4 and 5 of three control cables 6, 7 and 8. The sleeves 3 through 5 are routed through the housing, the door or the body, and are attached to a connector attached to the door or body at three equiangular points equidistant from the axis of the connector. The cables 6 through 8 sliding in the sleeves are fastened in the same geometrical manner in a swivel joint mounted to pivot about its center in all directions with respect to the connector which supports the swivel joint, which is provided with a manoeuvring level. The manoeuvring device described hereinabove is well known and, even if use, does not form part of the present invention; and, therefore, has not been illustrated. In any case the cables must transmit, to a support 9 of a mirror 10, which is mounted to oscillator relative to the plate 1, the movements communicated by the operator to the lever.

As clearly shown in the drawings, a crosspiece 11 is interposed between the plate 1 and the mirror support 9 of the mirror. The crosspiece includes two journals 12 and 13 which are aligned along a right-left pivot axis 14 of the crosspiece and which are set further apart from each other than on traditional crosspieces. Two journals 15 and 16 aligned along an up-down pivot axis 17 are also provided and, again, are set further apart from each other than on traditional crosspiece. The right-left (horizontal) and up-down (vertical) pivot axes 14 and 17, respectively, intersect.

According to the embodiment shown in the drawing, the crosspiece 11 is a frame of square shape with two sides 18 and 19, including the extending journals 12 and 13, which extend perpendicularly to the right-left pivot axis 14 and constitute horizontal guiding bearing surfaces. The other two sides 20 and 21, which include the journals 15 and 16, extend perpendicularly to the up-down pivot axis 17 thereof and constitute vertical guiding bearing surfaces. Of course, the frame may be rectangular instead of square.

The journals 12 and 13 are supported by bearings 22 and 23 of the support 9 of the mirror 10, while the journals 15 and 16 are supported by bearings 24 and 25 of the plate 1. The bearings 22 and 23 and 24 and 25 are advantageously fork-joints which are integral with the support 9 and plate 1, respectively. The fork-joints are narrow near their openings in order to allow easy assembly and dismantling of the journals 12 and 13, and 15 and 16, respectively.

The bearing surfaces 18 through 21 are designed to both guide and oppose vibrations by friction. To that end, the bearing surface 18 cooperates with two friction tabs 26 and 27 which are integral with the support 9 and are disposed on either side of the journal 12; similarly, the bearing surface 19 cooperates with two friction tabs 28 and 29 which are integral with the support 9 and are disposed on either side of the journal 13. On the other hand, the bearing surface 20 cooperates with two friction tabs 30 and 31 which are integral with the plate 1 and are disposed on either side of the journal 15. Similarly, the bearing surface 21 cooperates with two friction tabs 32 and 33 which are integral with the plate and are disposed on either side of the journal 16.

Since the bearings 22 to 25 are relatively remote from one another and the guiding bearing surfaces 18 through 21 are provided to cooperate with the friction tabs 30 through 33 and 26 through 29 of the axis of the plate 1 and of the axis of the support 9, respectively, guiding is very precise and very smooth and a high resistance to vibrations is achieved.

Moreover, it is possible to adjust the vibration resistance in the vertical pivoting mode, independently of the vibration resistance in the horizontal pivoting mode, by modifying the surface of the friction tabs 30 through 33 and 26 through 29.

Figure 4:
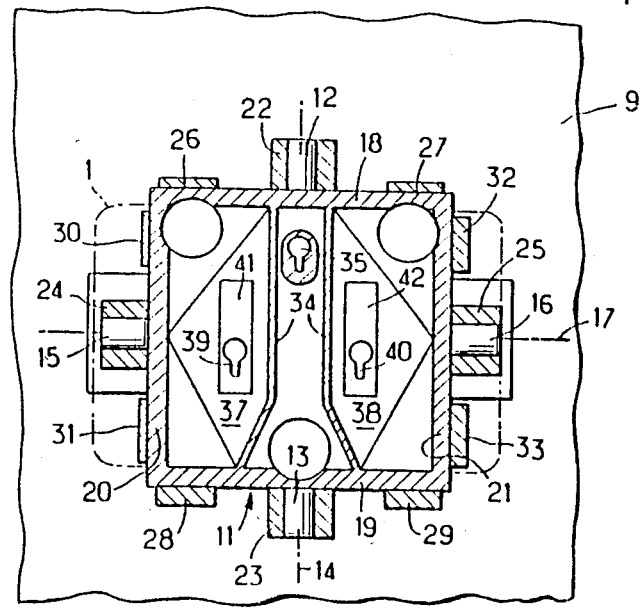
FIG. 4 is a cross-sectional view taken along line IV—IV of FIG. 3.

As shown in FIGS. 3 and 4, the crosspiece 11 includes a cross member 34 having an oblong opening 35 with a notch for engagement of a terminal head 36 of the free end of the cable 8. The notch of the opening 35 is located on the horizontal axis 14 at a sufficient distance from the vertical axis 17 to control up-down pivoting about the vertical axis.

The crosspiece 11 defines, on either side of the cross member 34, perforations 37 and 38 to allow passage of the cables 6 and 7 whose terminal heads are adapted to engage in notches of openings 39 and 40 provided in protuberances 41 and 42 which extend from the support 9 of the mirror 10. The notches are located at sufficient distance from the horizontal axis 14 to control left-right pivoting about such axis.

It is obvious that the bearings 22 and 23 as well as the friction tabs 26 through 29 may be carried by the plate 1; the bearings 24 and 25 as well as the friction tabs 30 and 33 then being carried by the support 9 of the mirror 10.

Although the best mode contemplated by the applicant for carrying out the present invention as of the filing date hereof has been shown and described herein, it will be apparent to those skilled in the art that suitable modifications and variations may be made thereto without departing from what is regarded as the scope of the invention, which invention is to be limited only by the terms of the claims appended hereto.

What is claimed is:

1. In a device incorporating three cables for controlling a mirror support for a rearview mirror, said mirror support comprising:

a fixed plate having a first pair of spatially separated bearings defining a first pivot axis;

a mirror support member having a second pair of spatially separated bearings defining a second pivot axis perpendicular to said first pivot axis;

a rectangular crosspiece disposed between said fixed plate and said mirror support member, said crosspiece having a first pair of bearing surfaces generally parallel to said second pivot axis and a second pair of bearing surfaces generally parallel to said first pivot axis, each bearing surface of said first pair of bearing surfaces having a journal received in a respective one of said first pair of bearings to permit said crosspiece to pivot relative to said fixed plate about said first pivot axis, each bearing surface of said second pair of bearing surfaces having a journal received in a respective one of said second pair of bearings to permit said mirror support member to pivot relative to said crosspiece about said second pivot axis;

means for connecting at least one of said three cables to said crosspiece;

means for connecting the remaining of said three cables to said mirror support member;

at least two friction tabs provided on said fixed plate offset from said first pivot axis, one of said at least two friction tabs frictionally engaging one bearing surface of said first pair of bearing surfaces and the other of said at least two friction tabs frictionally engaging the other bearing surface of said first pair of bearing surfaces to reduce the vibration of said crosspiece about said first pivot axis; and at least two friction tabs provided on said mirror support member offset from said second pivot axis, one of said at least two friction tabs provided on said mirror support member frictionally engaging one bearing surface of said second pair of bearing surfaces and the other friction tab of said at least two friction tabs engaging the other bearing surface of said second pair of bearing surface to reduce the vibration of said mirror support member about said second pivot axis.

2. The device of claim 1 wherein said fixed plate has four friction tabs, two of said four friction tabs provided on said fixed plate frictionally engaging said one bearing surface and the other two of said four friction tabs engaging said other bearing surface of said one pair of bearing surfaces and wherein said mirror support member has four friction tabs, two of said four friction tabs provided on said mirror support member frictionally engaging said one bearing surface and the other two of said four friction tabs engaging the other of said other pair of bearing surfaces.

3. The device of claim 1 wherein said one pair of bearing surfaces is said first pair of bearing surfaces and said other pair of bearing surfaces is said second pair of bearing surfaces.

4. The device of claim 1 wherein said rectangular crosspiece is a square crosspiece.

5. The device of claim 1 wherein said first pair of spatially separated bearings provided in said fixed plate are clippable fork joints integrally formed with said fixed plate and wherein said second pair of spatially separated bearings provided in said mirror support member are clippable fork joints integrally formed with said mirror support member.

6. The device of claim 1 wherein said crosspiece has a cross member disposed intermediate said first pair of bearing surfaces to which said one of said three cables is connected, and wherein said crosspiece has perforated areas in both sides of said cross member to permit the other two of said three cables to pass through said perforated areas to be connected to said mirror support member.

* * * * *

UNITED STATES PATENT AND TRADEMARK OFFICE
CERTIFICATE OF CORRECTION

PATENT NO. : 4,914,972

DATED : April 10, 1990

INVENTOR(S) : Bernard Manzoni

It is certified that error appears in the above-identified patent and that said Letters Patent is hereby corrected as shown below:

Column 1, line 27, delete "on" and insert ---- of ----.

Column 1, line 33, before "adjustment" insert ---- precision ----.

Column 1, line 45, after "invention" insert a comma ---- , ----.

Column 2, line 12, delete "of" and insert ---- to ----.

Column 2, line 51, delete "level" and insert ---- lever ----.

Column 2, line 52, delete "use" and insert ---- used ----.

Column 2, line 56, delete "oscillator" and insert ---- oscillate ----.

Column 2, line 66, delete "crosspiece" and insert ---- crosspieces ----.

Column 3, line 32, after "plate" insert ---- 1 ----.

UNITED STATES PATENT AND TRADEMARK OFFICE
CERTIFICATE OF CORRECTION

PATENT NO. : 4,914,972

DATED : April 10, 1990

INVENTOR(S) : Bernard Manzoni

It is certified that error appears in the above-identified patent and that said Letters Patent is hereby corrected as shown below:

Column 4, line 49, delete "surface" and insert ---- surfaces ----.

Signed and Sealed this

Fifth Day of May, 1992

Attest:

DOUGLAS B. COMER

*Attesting Officer*  *Acting Commissioner of Patents and Trademarks*